May 12, 1964  R. THOMPSON  3,132,756
TRASH AND MOSS REMOVER FOR CANALS
Filed June 25, 1962  6 Sheets-Sheet 1
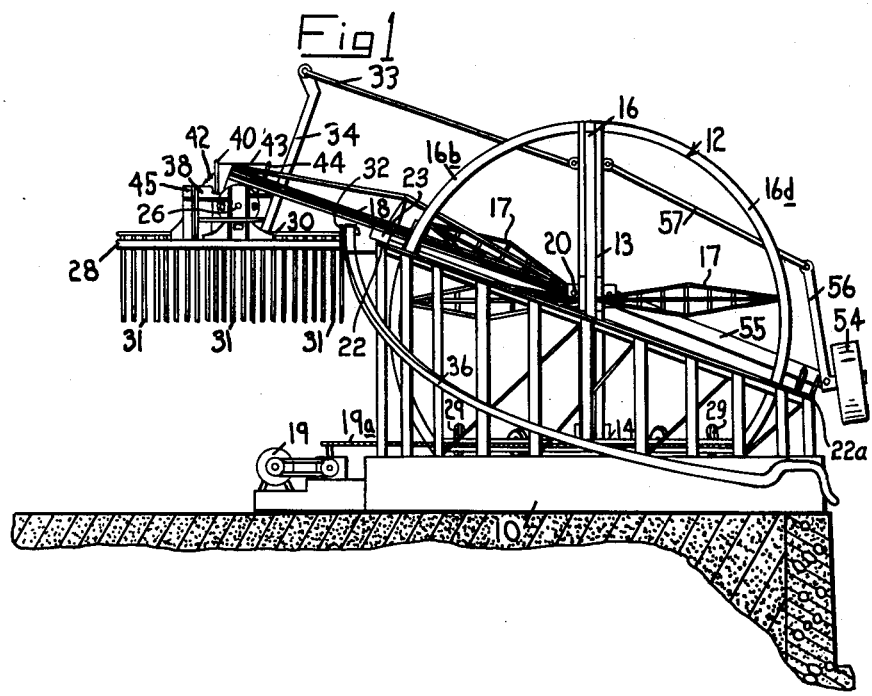
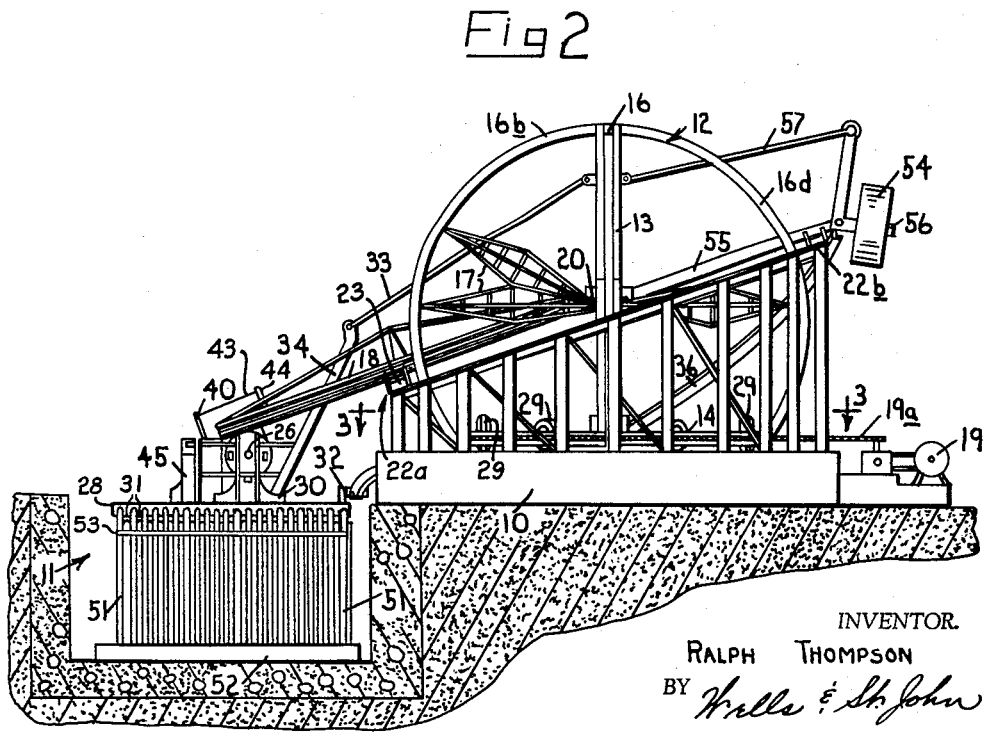
INVENTOR.
RALPH THOMPSON
BY *Wells & St. John*
ATTYS.

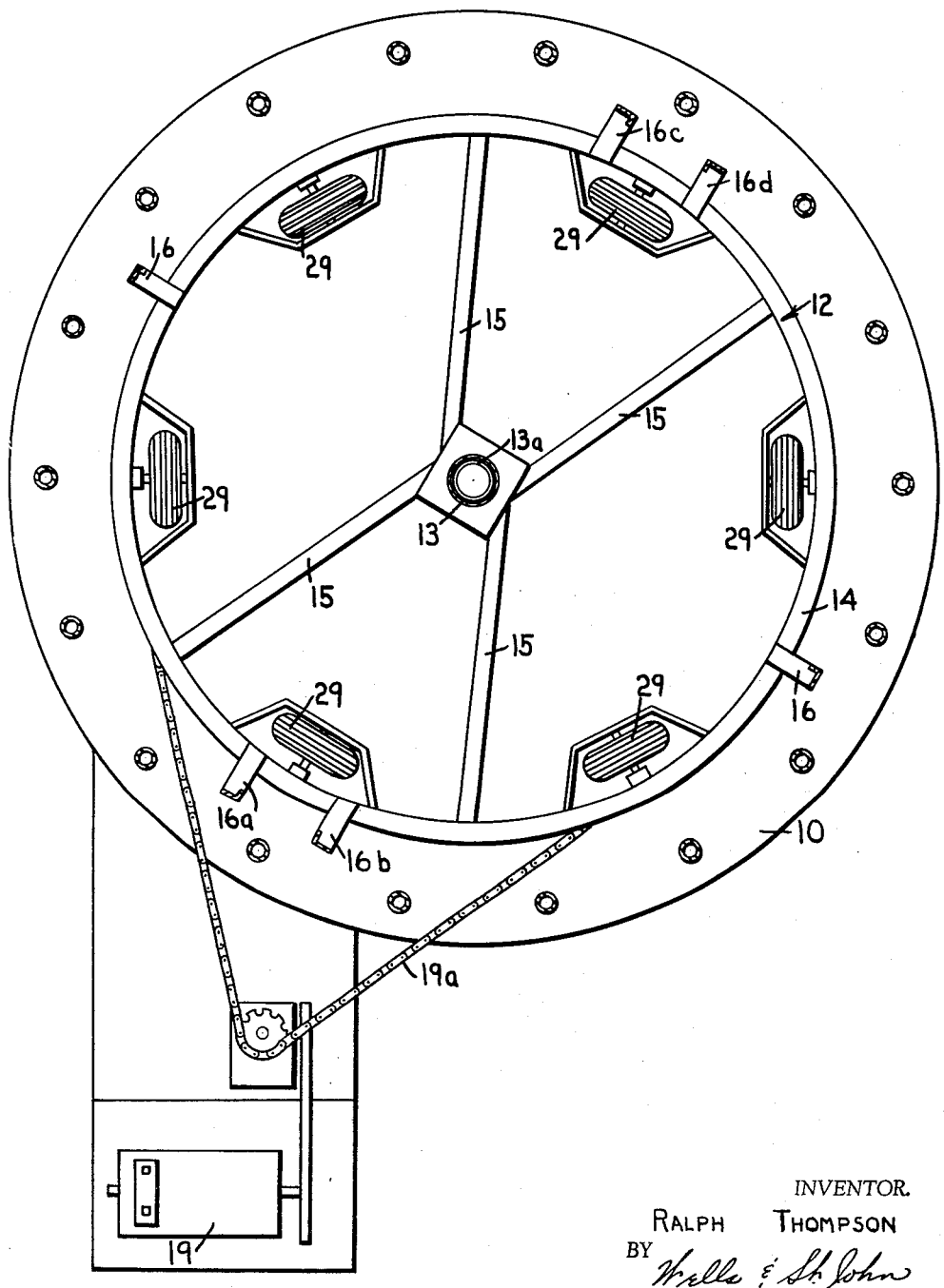

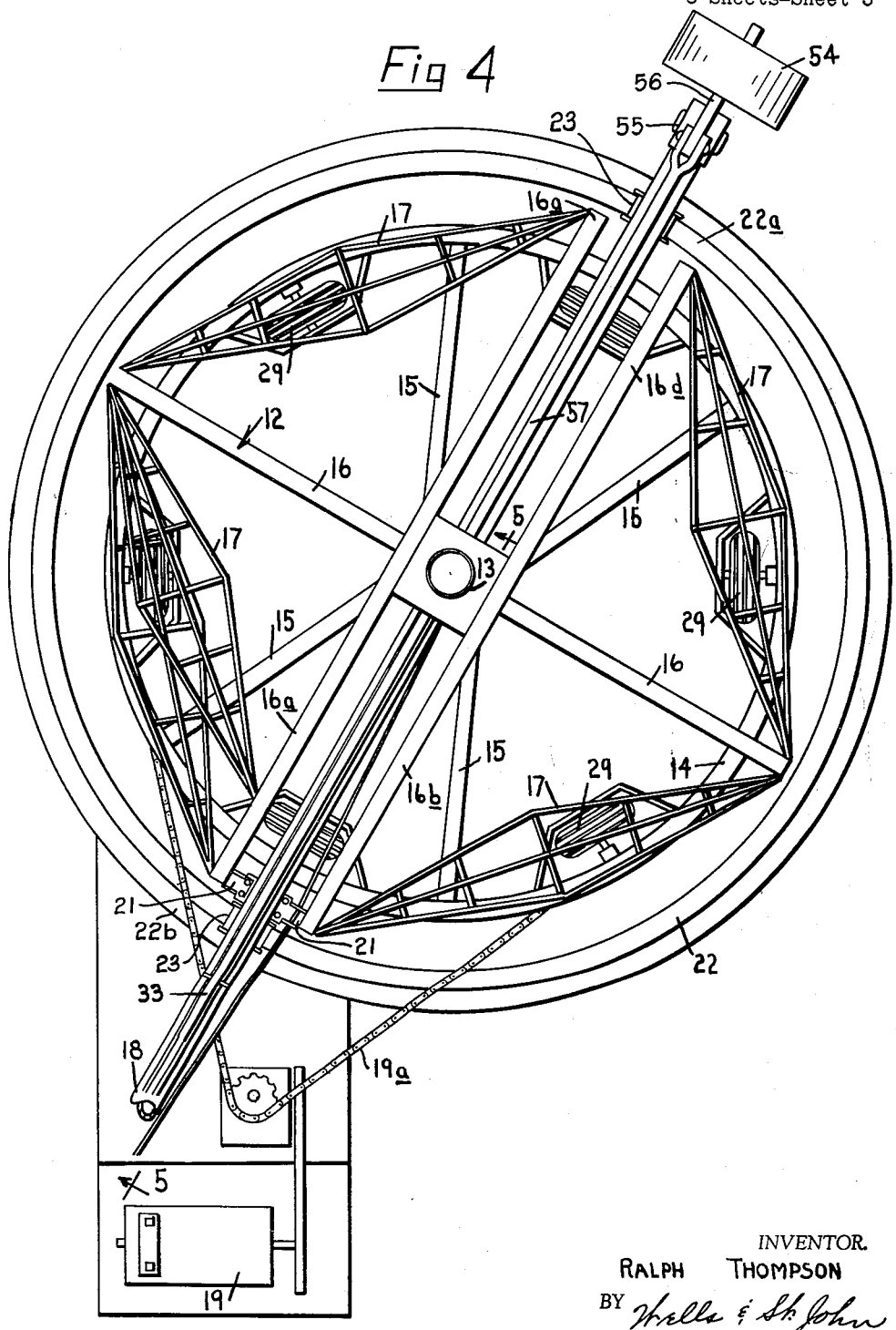

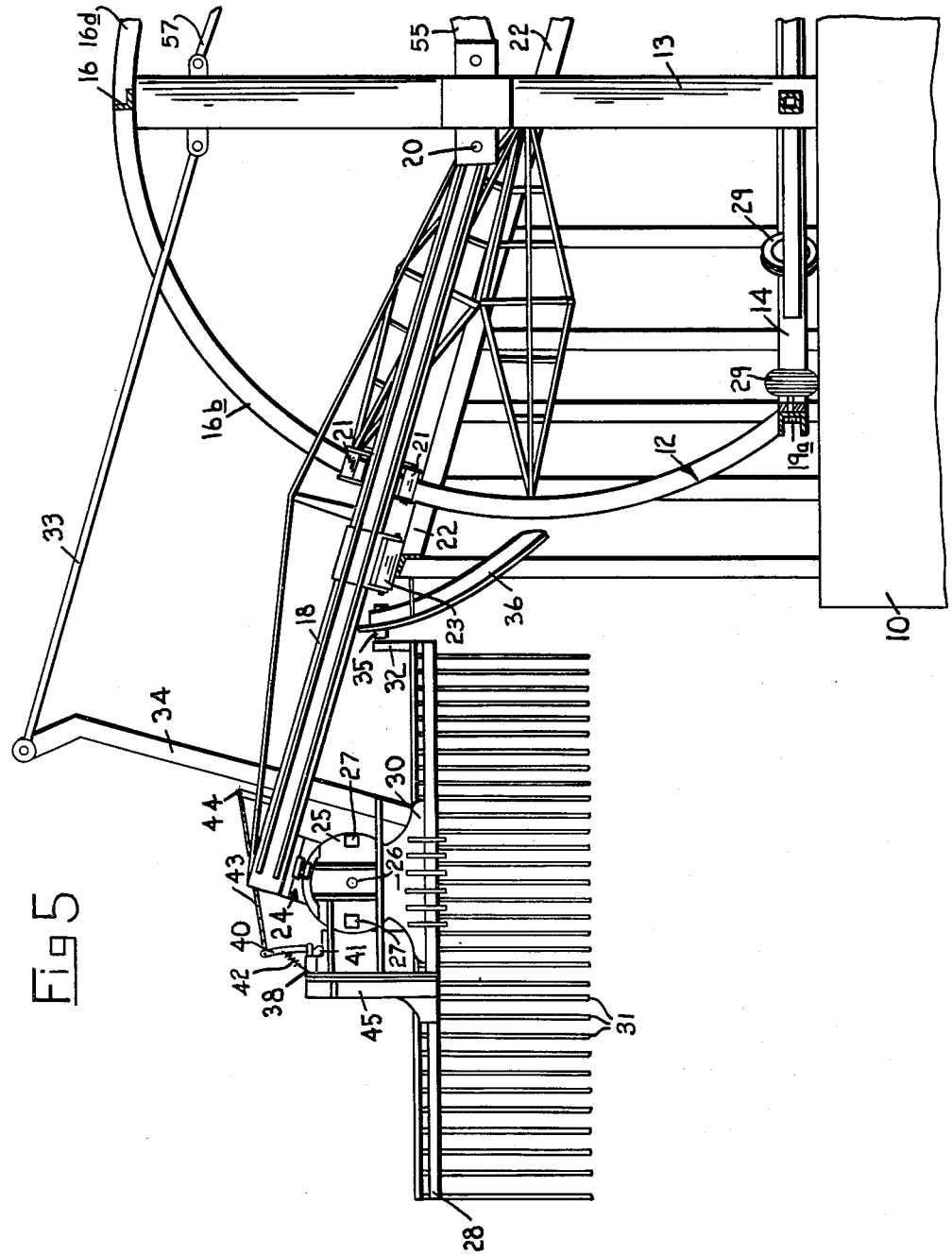

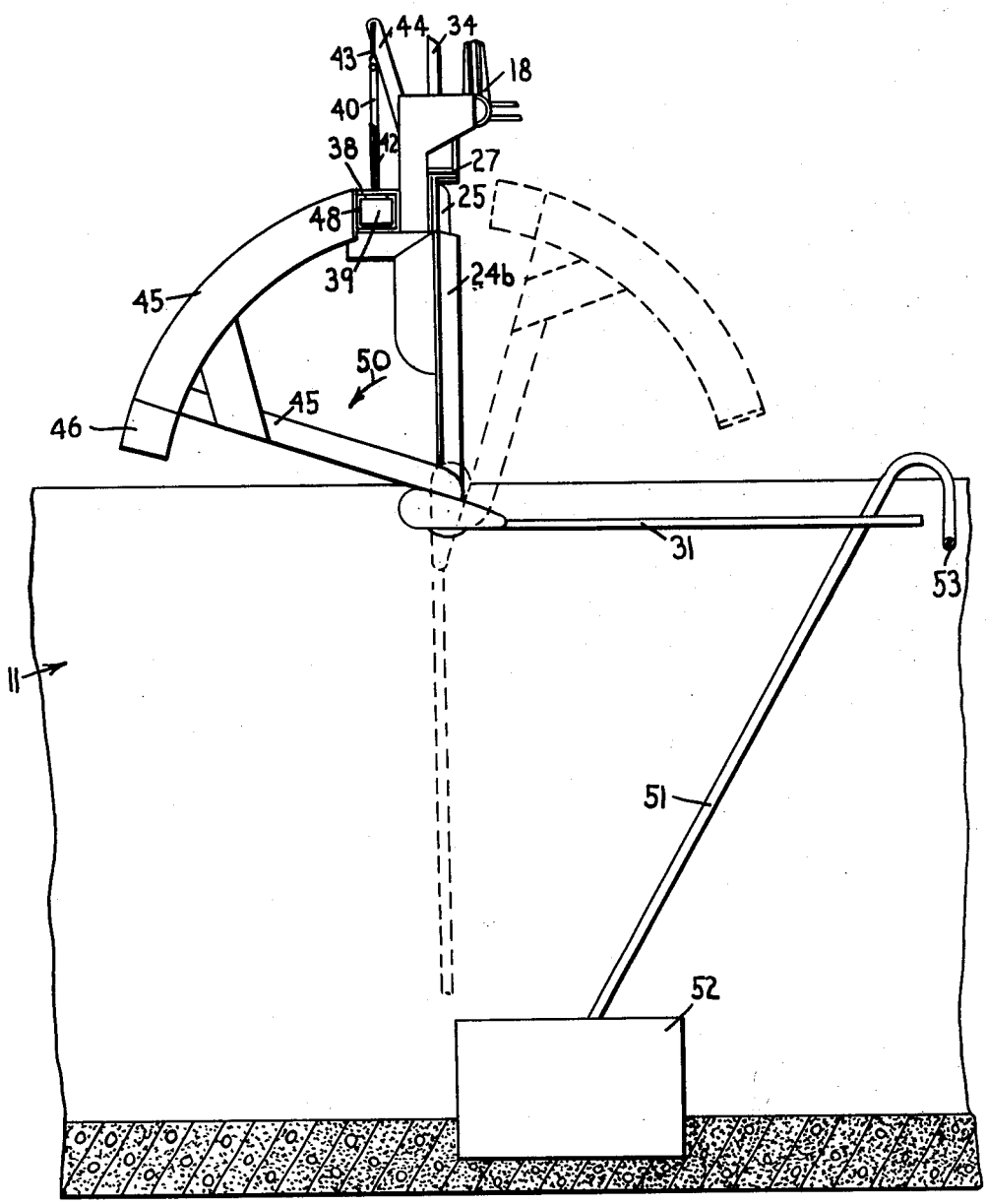

United States Patent Office 3,132,756
Patented May 12, 1964

3,132,756
TRASH AND MOSS REMOVER FOR CANALS
Ralph Thompson, P.O. Box 664, Glenns Ferry, Idaho
Filed June 25, 1962, Ser. No. 204,832
5 Claims. (Cl. 214—132)

This invention relates to a novel trash and moss removing machine for use on irrigation canals and ditches.

In areas where irrigation practices are prevalent, a serious problem is presented by the moss, leaves and other trash that accumulates in the canals and ditches and floats downstream to the gates where water is drained into the fields. Moss in particular is a serious menace to proper operation of such an irrigation system due to its tenacious clinging properties. The moss usually grows in the water along the walls of the canal and at present is dislodged by dragging chains along the canal length. The floating moss is then removed manually, using rakes or using other devices. The present invention is a mechanical apparatus for removing such moss and debris from an irrigation canal and is designed to deposit this trash on the canal banks in a continuous operation.

It is a first object of this invention to provide a completely automatic mechanical apparatus for performing this cleaning function in canals. The machine requires no manual observation and may be used continuously over an entire season without maintenance.

Another object of this invention is to provide an active raking movement in such a machine capable of lifting moss and debris from a canal. The machine is further capable of dropping the wet moss and debris when such dumping action is desired.

Another object of this invention is to provide a machine which is capable of raking a canal area continuously whether or not a stationary grill is utilized across the canal to prevent passage of moss along the length thereof.

Another object of this invention is to provide a machine which may be operated with a very small power requirement and therefore at an economical cost.

These and further objects will be evident from a study of the following description taken in conjunction with the accompanying drawings which illustrate one preferred form of the invention. This form is merely exemplary and is not intended to limit or restrict the scope of the invention as it is claimed at the end of the specification.

In the drawings:

FIGURE 1 is an elevation view of the machine showing the tined fork at its highest elevation and in a vertical position;

FIGURE 2 is a view similar to FIGURE 1 showing the fork at its lowest elevation as it rakes moss and debris from a stationary grill;

FIGURE 3 is an enlarged sectional view taken along line 3—3 in FIGURE 2;

FIGURE 4 is an enlarged top view of the apparatus as seen in FIGURE 1 with the outer end of the arm and the fork member broken away;

FIGURE 5 is an enlarged elevation view of the supporting arm and fork assembly taken along the line 5—5 in FIGURE 4 and showing the fork assembly in the attitude illustrated in FIGURE 1;

FIGURE 6 is an enlarged elevation view of the supporting apparatus for the fork as seen from the rear in FIGURE 5;

FIGURE 7 is an enlarged top view of the supporting apparatus for the fork looking down on FIGURE 6 with the tines in a horizontal position; and FIGURE 8 is an end view of the fork and its supporting assembly showing the vertical position of the tines in dashed lines and illustrating the relationship of the tines and a stationary canal grill.

The present invention relates to a novel machine for removing moss, leaves and other trash from an irrigation canal or ditch. The debris to be carried by this machine is assumed to be floating at the surface of the canal which is normally filled to a constant level. The canal structure may be of any suitable type and may be lined or unlined. The primary object of the machine is to lift the debris from the water and dump it on the adjacent bank in a continuous mechanical operation.

The machine illustrated in the drawings is supported on a fixed slab or base 10, having a plane horizontal top surface. The base 10 is positioned adjacent an irrigation ditch generally designated by the numeral 11. The base 10 supports a movable frame 12 which is mounted on the base 10 by means of a vertical central shaft 13 rotatably supported on a fixed stub shaft 13a projecting upwardly from the top surface of the base 10. The frame 12 includes a circular base ring 14. Ring 14 is supported on the top surface of base 10 by means of a plurality of wheels 29 which are mounted on the frame 12 for rotation about radial axes relative to the central vertical axis of shaft 13. The ring 14 is provided with a series of cogs which cooperate with a chain 19a driven by a motor 19, also fixed relative to the base 10. Thus the ring 14 serves as a large diameter reducing gear in order that the frame 12 may be driven by a motor 19 of relatively small size. The base ring 14 is radially supported by braces 15 and by upwardly extending curved members 16 which are actually formed as part of a circle. Two pairs of these members designated as 16a, 16b, 16c and 16d serve a two-fold purpose as supporting braces and also as vertical guides for the moving mechanism to be described below. The curved members 16 are connected to one another at their mid-points by strut members 17 so as to complete a rigid structure for the frame 12.

Mounted on the frame 12 is a radially extended support arm 18 which is pivotally connected to shaft 13 at a location designated by the numeral 20. The elevation of the pivotal connection 20 of support arm 18 is approximately at the mid point of the shaft 13. The support arm 18 extends between the first pair of curved members 16a, 16b and is provided with guide rollers 21 which respectively abut these curved members 16a and 16b. Thus the support arm 18 is free to pivot about the connection 20 and is guided for pivotal movement by contact of the rollers 21 with the adjacent members 16a and 16b.

In order to elevationally position the arm 18, a first fixed cam track 22 is mounted on the base 10. The cam track 22 may have any desired configuration but should preferably extend in a continuous fashion from a position of minimum height, designated as 22a, to a position of maximum height, designated as 22b. The cam track 22 supports the arm 18 intermediate the ends thereof by means of contacting rollers 23 which are carried on the underside of the support arm 18. As shown in the drawings, the cam track 22 constitutes a circular track set at an angle to provide the two positions 22a and 22b at locations 180 degrees apart. The angular separation of these two positions may be varied as desired in a particular installation.

Figures 6, 7:
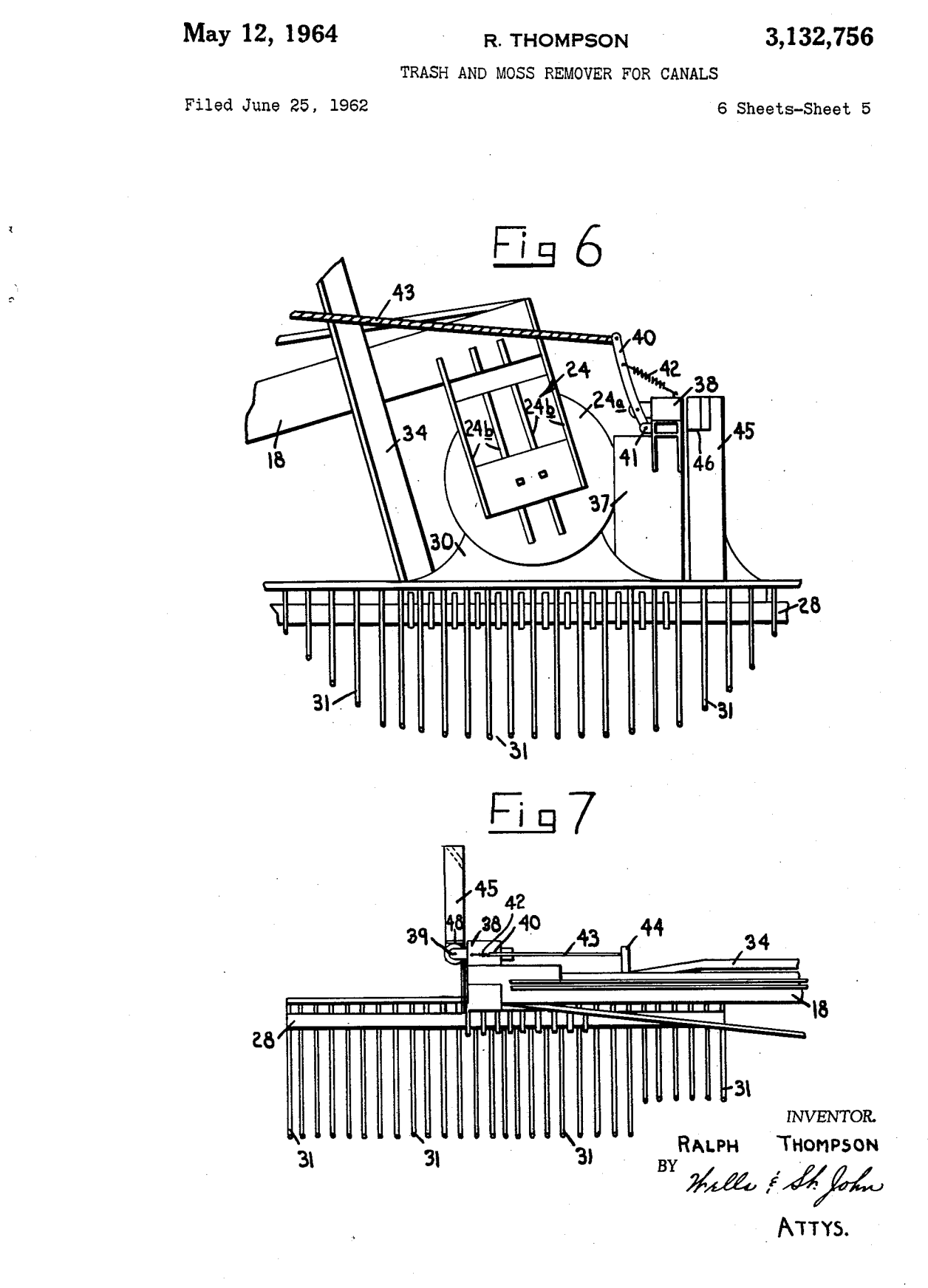

The arm 18 has a vertical support plate 24 fixed to its outer end. This plate 24 can best be seen in FIGURE 6. It includes a circular disk 24a and supporting ribs 24b suitable to provide the necessary strength in this assembly. The support plate 24 pivotally carries a mounting plate 25 which can be best seen in FIGURE 5. The mounting plate 25 is rotatably journalled about a central axis 26 on the plate 24 and carries a series of radial rollers 27 to facilitate easy pivotal motion of the plate 25 relative to plate 24 about the axis 26. The rollers 27 extend through suitable openings cut through the mounting plate 25.

At the lower end of the mounting plate 25 is a support ear 30 for a shaft 28, which extends along a radial axis relative to the axis of the central shaft 13. This shaft 28 is pivotally mounted by the support ear 30 and has fixed thereto a plurality of parallel open tines 31. Each tine 31 is simply a metal rod of suitable diameter and strength to withstand the strain involved in trash removal.

At the inner end of the shaft 28 is fixed a crank arm 32 which extends radially outward from the main shaft 28. The extension of crank arm 32 terminates at a roller 35 which rides under a second fixed cam track 36 mounted on the base 10. The second cam track 36 is again a continuous track but extends only partially about the circumference of base 10 from a position adjacent the maximum height position 22b to a position adjacent the minimum height position 22a in a direction of motion of the frame 12. The precise configuration of this cam track is also subject to variance but will be described more in relation to the functional operation of this assembly.

In order to maintain the fork, consisting of the shaft 28 and tines 31, in a horizontal position regardless of the elevation of the outer end of arm 18, there is provided a stabilizing crank arm 34 which is fixed to the ear 30 and which extends upwardly therefrom. At its upper end this crank arm 34 is pivoted to a link 33. The remaining end of link 33 is pivoted to the shaft 13 above the pivotal connection of arm 18. Thus in effect a parallelogram supporting linkage is provided which maintains the mounting plate 25 and shaft 28 in a constant angular position about the axis 26.

In order to effectively clean a canal or ditch of floating moss and debris, the tines 31 must approach a fixed grill or be raised upward toward the water surface while in a horizontal position. In order to effectively dump the clinging moss and debris, the tines 31 must be allowed to fall freely to a vertical position due to their weight. This is accomplished by means of a latch mechanism and by cooperation of the roller 35 and the cam track 36.

The latch arrangement comprises a pedestal 37 which is built onto the mounting plate 25 and ear 30. This pedestal is capped by an enclosed channel 38 which is open at its axial ends only and which serves as a longitudinal guide for a roller latch member 39 slidably mounted therein. One protruding end of the member 39 is pivotally connected to a lever 40, as can best be seen in FIGURES 6 and 7. The lever 40 is pivoted at its lower end to the pedestal 37 about an axis 41. The lever 40 is biased to a position wherein the roller latch member 39 protrudes beyond the remaining open end of the channel 38. This biasing action is provided by a spring 42 connected between lever 40 and the top of channel 38. The upper end of lever 40 is connected by means of a short cable 43 to an upright post 44 fixed to the arm 18.

The latch member 39 is designed to cooperate with an arcuate extension 45 fixed to the shaft 28 and extending upwardly therefrom. Extension 45 is provided with a bent rear end portion 46 which is formed so as to ride over the latch member 39 when pivoted in the direction designated by the arrow 50 in FIGURE 8. The front end 48 of the extension 45 is adapted to abut the roller latch member 39 and thereby maintain the tines 31 in a horizontal position.

The machine as described is capable of cleaning a canal by itself by simply coming up to the water surface in an upstream direction. It is primarily usable with a stationary grill having a plurality of tines 51 in a base 52 and extending upwardly to the water surface. Since the grill must be open at its upper end in order to provide exit for the tine 31, the tines 51 are shown curving downwardly from their uppermost ends and being connected to one another by a lower cross rod 53. Any similar grill assembly may be utilized if desired.

The operation of this machine is very simple. Each revolution of the frame 12 will cause one complete cleaning cycle to be accomplished. During this cycle the tines 31 will first come downwardly toward the water level as the arm 18 traverses the area of cam track 22 from the position 22b to the position 22a. During this period of travel the second fixed cam track 36 will be engaged by the roller 35 and will progressively swing the shaft 28 and tines 31 about their pivotal radial axes until the front end 48 of the arcuate extension 45 has moved to a position rearward of the lower latch member 39. This horizontal position of the tines 31 is then utilized to lift moss or debris from the water surface or from the grill tine 51 as the arm 18 begins its upward travel beyond the cam track position 22a. The tines 31a are then retained in a horizontal position due to the action of the latch member 39, although the roller 35 has now passed the end of the cam track 36.

Since moss and wet trash tenaciously cling to a fork, the tines 31 are abruptly dropped at an elevated position of arm 18 above the adjacent bank of the irrigation ditch 11. The position at which the tines 31 are dropped is determined by the angular position of the arm 18 about its pivotal connection 20 and by the length of cable 43 which connects the lever 40 and the post 44. As the arm 18 is raised the pivotal axis 41 of the lever 40 remains in a constant position relative to the axis 26 of mounting plate 25. The post 44 tilts angularly relative to this same axis and therefore gradually pulls the cable 43 and this turns the lever 40 on the axis 41 to withdraw the roller latch member 39 into the channel 38 out of the path of the end 48 to release the arcuate extension 45, thereby allowing the tines 31 to abruptly drop downwardly due to their own weight. When the arm 18 is lowered the post 44 will tilt back the other way, allowing the spring 42 to pull the lever 40 in the direction to project the roller latch member 39 into the path of the extension 45. As this extension 45 is swung from the dotted line position shown in FIGURE 8 toward the full line position by the roller 35 on the crank arm 32 engaging the cam track 36, the end 46 of the member 45 will ride over the member 39 and push it back against the force of the spring 42 until the end 48 of the extension 45 is reached. Then the member 39 moves out of the channel 38 and again holds the extension 45 in position to keep the fingers 31 in horizontal position.

Since one of the objects of this invention is to provide a machine capable of continuous operation over a period of months or for a complete irrigation season, it is necessary that the motor 19 be conserved insofar as possible. The machine shown in the drawings utilizes only a single arm 18 and a single fork apparatus. If desired, two or more arms 18 could be provided on the frame 12 at equiangularly spaced positions. The function of each fork would be the same as described above and the cleaning operation would be repeated a multiple number of times during each revolution of frame 12. Such a construction would be most advantageous where the machine is used in an upstream operation without fixed grill tines across the ditch width. The frame 12 provides the sole driving force to the arm 18 through means of guide rollers 21 and through members 16a and 16b. All other operations of the fork are controlled by means of the two cam tracks 22 and 36.

In order to more effectively drive this machine utilizing a single support arm 18 the weight of the fork apparatus is preferably counter-balanced by a suitable weight 54 mounted oppositely to the arm 18 on a second arm 55. The weight 54 is pivotally carried on arm 55 and is angularly supported by a crank arm 56 fixed thereto and connected to a link 57. This structure can best be seen in FIGURES 1 and 2. The parallelogram supporting arrangement in this instance serves to lift the weight 54 at its lower elevational positions so that the weight 54 will not enter the water of ditch 11. The counterbalance provided by weight 54 prevents the rather heavy arm 18 and its attendant form structure from over-running the motor 19 during its downward travel along the cam track 22. The weight 54 also aids the motor 19 in lifting the arm 18 during upward travel of arm 18 along the cam track 22. Thus the weight 54 serves principally as a driving counter-balance to assist the motor 19 and to prevent great variations in the driving torque necessary to operate this machine during the periods of its revolution.

The present invention, although embodied in the specific machine illustrated in the drawing, is not intended to be limited by the exact configurations of this example. Many modifications could obviously be made in the design of the frame 12, while retaining its necessary functional relationships relative to the support arm 18 and the tines 31 of the fork assembly. Other suitable latch mechanisms may be substituted, as an example, without deviating from the basic concepts of this invention. For these reasons, the invention is intended to be limited and restricted only by the following claims.

Having thus described my invention, I claim:

1. A trash remover comprising:
a fixed base having a plane horizontal top surface;
a rigid frame rotatably mounted on said base above said surface for motion about a fixed vertical axis;
drive means operatively connected to said frame adapted to move said frame from a first position to a second position about said vertical axis;
a supporting arm connected to said frame for pivotal motion about a horizontal axis on said frame and extending radially outward therefrom;
a forked member pivotally mounted on said arm for motion about a horizontal axis perpendicular to a radius drawn from said vertical axis, said forked member including a plurality of parallel tines fixed to a shaft pivoted to said forked member on an axis that extends radially with respect to said vertical axis;
stabilizing means operatively connected to said frame and to said forked member adapted to maintain said radial axis of said shaft in a horizontal position;
elevational means on said base adapted to engage said arm to thereby elevationally position said arm about its horizontal pivotal axis during movement of said frame;
means fixed to said base adapted to engage said forked member so as to selectively cause said tines to attain a horizontal position;
latch means on said forked member adapted to selectively maintain said tines in a horizontal position;
and means on said arm operatively connected to said latch means adapted to release said tines from engagement therewith responsive to attainment of a predetermined elevational height by said arm about the horizontal pivotal axis.

2. A trash remover comprising:
a fixed base having a plane horizontal top surface;
a rigid frame rotatably mounted on said base for motion about a fixed vertical axis, said base being supported on said surface by a plurality of surface-engaging wheels rotatably journalled on said frame about radial axes relative to said vertical axis;
motor means on said base operatively connected to said frame adapted to rotate said frame about said vertical axis;
a supporting arm connected to said frame for pivotal motion about a horizontal axis on said frame and extending radially outward therefrom;
a forked member pivotally mounted on said arm for motion about a horizontal axis perpendicular to a radius drawn from said vertical axis, said forked member including a plurality of parallel tines fixed to a shaft pivoted to said forked member on an axis that extends radially with respect to said vertical axis;
stabilizing means operatively connected to said frame and to said forked member adapted to maintain said radial axis of said shaft in a horizontal position;
a first fixed cam track mounted on said base adapted to elevationally support said arm intermediate its ends to thereby position said arm about its horizontal axis during movement of said frame about said vertical axis;
a second fixed cam track mounted on said base adapted to contact a radially extended member fixed to said shaft, to thereby swing said tines from a normal vertical position to a horizontal position during movement of said frame about said vertical axis;
latch means on said forked member adapted to selectively maintain said tines in a horizontal position;
and means on said arm operatively connected to said latch means adapted to release said tines from engagement therewith responsive to attainment of a predetermined elevational height by said arm about its horizontal pivotal axis.

3. The device as defined in claim 2 wherein:
said motor means is connected to said frame so as to continuously rotate said frame about said vertical axis;
said first fixed cam track comprising a continuous member extended about said vertical axis and varying in elevation between a position of minimum height and a position of maximum height;
said second fixed cam track comprising a member extending about said vertical axis from a position angularly adjacent said position of maximum height of said first fixed cam track to a position angularly adjacent said position of minimium height in the direction of rotation of said frame.

4. A device for lifting floating trash from the water in canals comprising:
a base having a central vertical guide and a horizontal support surface concentric with said guide;
a frame including a shaft rotatably mounted by said guide and a drive ring fixed to said shaft;
wheels supporting said frame on the support surface;
power means connected to the drive ring for rotating said frame;
a rake supporting arm pivoted at one end on said frame to swing up and down and having a rake assembly mounted to its other end to rotate with respect to the arm in a plane substantially radial to said shaft;
cooperating means on said frame and said arm forcing said arm to rotate with the frame;
an inclined cam track around said frame on which said arm rides operable to carry the arm and move it up and down to enable said rake assembly to drop below said base for entry into a canal alongside the base and cause the assembly to rise above the base at an opposite point;
said rake assembly including a tined shaft extending in radial direction with respect to said first named shaft;
means interconnecting said rake assembly and said frame operable to keep the tined shaft substantially horizontal throughout the travel of said arm;
a crank arm on the tined shaft; and
a cam track alongside said frame engageable by said crank arm and cooperating therewith to direct the tines on said shaft forward horizontally in the direction of travel of said arm while the rake assembly is approaching its lower position.

5. A device for lifting floating trash from the water in canals comprising:
a base having a central vertical guide and a horizontal support surface concentric with said guide;
a frame including a shaft rotatably mounted by said guide and a drive ring fixed to said shaft;

wheels supporting said frame on the support surface;
power means connected to the drive ring for rotating said frame;
a rake supporting arm pivoted at one end on said frame to swing up and down and having a rake assembly mounted to its other end to rotate with respect to the arm in a plane substantially radial to said shaft;
cooperating means on said frame and said arm forcing said arm to rotate with the frame;
an inclined cam track around said frame on which said arm rides operable to carry the arm and move it up and down to enable said rake assembly to drop below said base for entry into a canal alongside the base and cause the assembly to rise above the base at an opposite point;
said rake assembly including a tined shaft extending in radial direction with respect to said first named shaft:
means interconnecting said rake assembly and said frame operable to keep the tined shaft substantially horizontal throughout the travel of said arm;
a crank arm on the tined shaft;
a cam track alongside said frame engageable by said crank arm and cooperating therewith to direct the tines on said shaft forward horizontally in the direction of travel of said arm while the rake assembly is approaching its lower position;
cooperating latch means on said rake assembly and on the tined shaft engaged by movement of said tines to said forward position to prevent lowering of the tines;
a latch release lever connected to the latch means on the rake assembly, and
a flexible member connecting said lever to the rake supporting arm operating to disengage the latch means as the rake supporting arm rises.

References Cited in the file of this patent

UNITED STATES PATENTS

| | | | |
|---|---|---|---|
| 15,875 | Bourbin | Oct. 14, | 1856 |
| 677,538 | Dalton | July 2, | 1901 |
| 830,090 | Mahoney | Sept. 4, | 1906 |
| 1,170,654 | Martin | Feb. 8, | 1916 |
| 1,442,939 | Greenleaf | Jan. 23, | 1923 |
| 2,391,224 | Carter | Dec. 18, | 1945 |
| 2,632,575 | Geraldson et al. | Mar. 24, | 1963 |